April 26, 1955  H. U. SPENCE  2,706,914
VARIABLE SPEED TRANSMISSION
Filed June 5, 1951  2 Sheets-Sheet 1
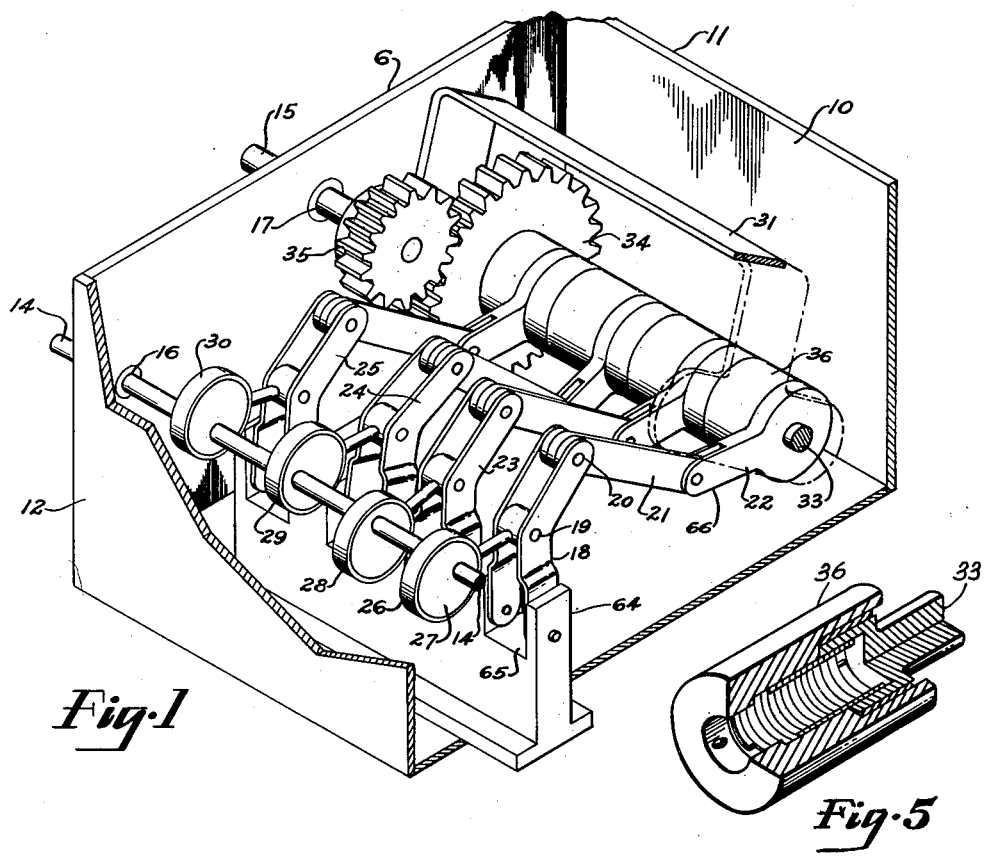
Fig. 1
Fig. 5
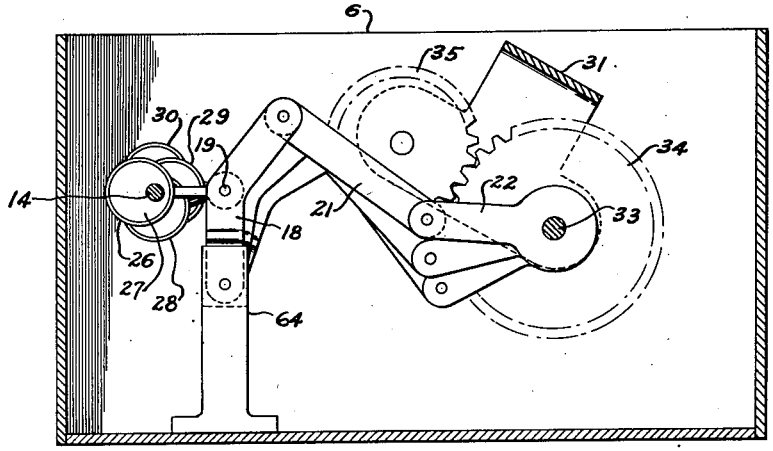
Fig. 2
INVENTOR.
HENRY U. SPENCE
BY Fay & Fay
ATTORNEYS April 26, 1955     H. U. SPENCE     2,706,914

VARIABLE SPEED TRANSMISSION

Filed June 5, 1951     2 Sheets-Sheet 2

INVENTOR.
HENRY U. SPENCE

BY Fay & Fay

ATTORNEYS

United States Patent Office 2,706,914
Patented Apr. 26, 1955

2,706,914

VARIABLE SPEED TRANSMISSION

Henry U. Spence, Painesville, Ohio

Application June 5, 1951, Serial No. 229,990

2 Claims. (Cl. 74—113)

This invention primarily concerns variable speed transmissions, particularly automatic transmissions for small power units that are able to provide a speed on the output shaft that may be varied as desired or which will vary itself automatically to accommodate itself to the needs of a changing load. This variable speed transmission combines an oscillating power source and spring clutches with the addition of a swinging carriage which changes the output speed and which may be mounted to change the torque as the load changes. Thus it may be seen that this transmission has an infinite variety of speed setting from zero to maximum, or provision for automatically shifting the speed and increasing the torque in order to adapt to new load conditions.

An object of this invention is to produce in a small compact unit a variable speed transmission adaptable to quick changing of the output speed.

Another object of this invention is to produce a transmission that will adapt itself to changing load conditions, as for example by increasing the torque and decreasing the speed with an automatic return to the higher speed as the load decreases.

Another object of the invention is to produce a transmission unit with an infinite variety of output speeds from zero speed to maximum driving speed.

A still further object of this invention is to produce an automatic transmission that may be shifted from the maximum through the zero speed position into the reverse direction if conditions should require that.

Other objects and advantages of the invention will be apparent from the following detailed description of a preferred form of the invention, reference being made to the accompanying drawings.

In said annexed drawings—

Fig. 1 is a cutaway perspective drawing of the transmission;

Fig. 2 is a front view along the lines 2—2 of Fig. 1;

Fig. 5 is a cutaway perspective view of one of the spring clutches.

Figure 3:
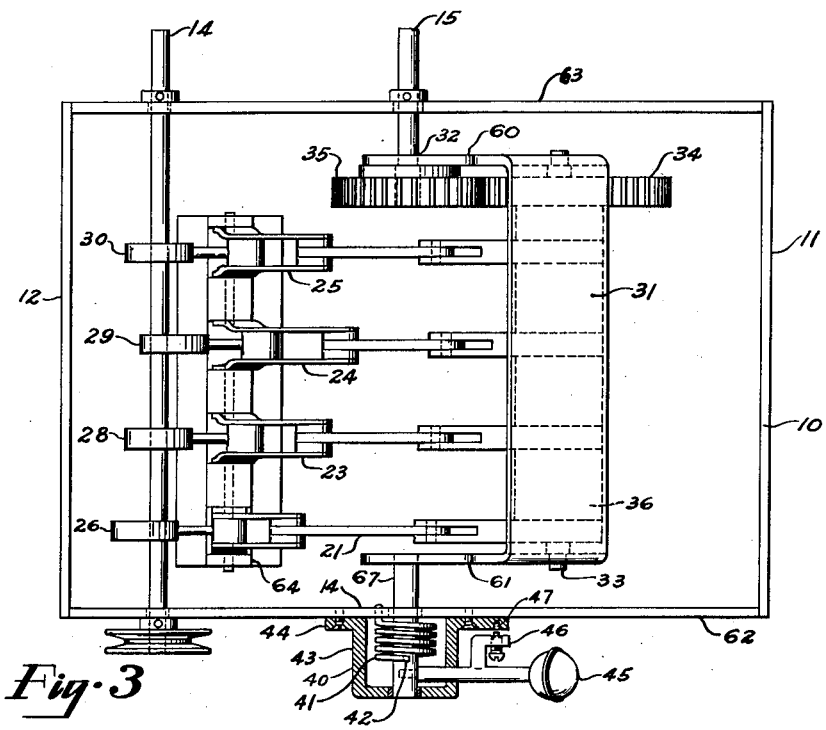
Fig. 3 is a plan view of the invention in maximum speed position.

Referring now to Fig. 1, 10 is a case or container for the transmission having front and rear sides 62 and 63 and left and right sides 11 and 12. Within the case there is an input drive shaft 14 and an output drive shaft 15. These project through holes in the side, 16 and 17 respectively. Mounted within the case in a supporting unit or rail 64 having stops or notches 65 cut therein in which are pivotally mounted a plurality of linkage means that are all identical. The linkage consists of an angular link or fork 18 mounted in notch 65 having an intermediate pivot 19 connected to the input drive shaft 14. The opposite end 20 of the angular link 18 is connected to a link 21 which in turn is connected to a spring clutch 22. The above description is given of a linkage means, of which a plurality are required to operate this invention. In view of the fact that the other links are identical, but successively positioned at any one instant they are not described in further detail. These further linkage means are indicated at 23, 24 and 25. The above linkage means is connected by the intermediate pivot 19 to a bushing 26 within which is an eccentric cam 27 secured to a part of the shaft 14. Each of the cam members 28, 29 and 30 are identical and are positioned at a fixed interval from the geometric center of the cam but are mounted in successive position around the center so that as the shaft rotates the eccentric cams will provide an oscillatory motion in a transverse direction and operate the above described linkage means.

The balance of the mechanism consists of a carriage 31 having two pair of ears 60 and 61, one of said ears being pivoted to the output drive shaft at 32 and on the opposite side a corresponding ear being attached to an end shaft 67 mounted in the side 62 of the case. The carriage is designed to pivot freely within the case and has attached to the remaining ears of the carriage a shaft 33 upon which are fastened a number of spring clutches. As may be seen from the drawings, there are an equal number of clutches as there are eccentric cams and linkage means. Also mounted on the shaft is a large gear 34 which intermeshes with another gear 35 fastened to the output shaft 15. The carriage is designed to pivot about its axis on output shaft 15 and move the large gear 34 to a position as shown in Figs. 1, 2 or 3 to a lower position shown in Fig. 4. The first position shown and described provides the maximum speed to the output shaft 15, while the lower position Fig. 4, the minimum speed. As the carriage pivots about the shaft to a position as in Fig. 4 the speed of the output shaft is decreased because of the shorter length of contact that the power stroke makes upon the spring clutches. This operation above described is a normal one and the versatility provided contributes to the success of this invention. In operation, should a load increase upon the output shaft, the carriage moves to a lower position beneath the output shaft so that the strokes upon the spring clutches are decreased and the power to each revolution of the output shaft is increased.

In connection with said spring clutches I have illustrated one of them in Fig. 5. Basically they consist of a flat coil spring mounted within a housing, having an end plate or member to catch one end of the spring which is then in turn mounted within the housing. Said end plate may conveniently have an arm extending therefrom. Upon movement of the arm in one direction the coil expands, grabbing the housing and rotating same. A movement in the opposite direction causes the spring to contract and slide within the housing.

In addition, there is a spring means for returning the carriage mechanism to the maximum speed position shown in Fig. 1. The spring clutches 22 consist of a contact arm 66 mounted upon an axle 33 having a covering member 36 and internally thereof a flat axial spring which is contacted by the contacting arm 66. As force is applied to this arm the spring, which is fastened at its lower end, expands to rotate the shaft to turn gear 34 and drive the output shaft 15. Each of these spring clutches will contact in one direction only and exert no force upon the output shaft when returning to position for a subsequent power stroke. A multiplicity of eccentric cams, linkage means and spring clutches operate in sequence to provide overlapping power strokes to the spring clutches and give a constant power to the output shaft. Better overlap is provided with 4 or more strokes and clutches but 3 may be used.

In one position, as indicated in Figs. 1, 2 or 3 the power stroke of the nearest eccentric cam, linkage means and spring clutch will be pushing link 18 away from the plane of the drawing and to the right when the shaft is rotating in a clockwise direction. Link 18 in turn operates link 21 and moves the arm 66 of the spring clutch and provides an output power stroke. It can readily be seen by following the structure of Fig. 1 that if shaft 15, the output shaft, is frozen or subject to greatly increased load, that the carriage will pivot about the shaft under the force of this above described power stroke and will rotate the carriage and gear 33 about the gear 35 to the position shown in Fig. 4. As this is accomplished the duration of the power strokes will decrease and each stroke will be effective for a shorter arc with more power. In this way the speed of the output shaft decreases, but because the input is relatively constant in torque, it will provide the increased torque to the output shaft. If for any reason the load is decreased, a spring mechanism generally indicated at 40 will return the carriage to the original position. It will be understood that if the automatic shifting of the carriage is not desired the speed may be set at any position that is desired.

Very often a source of power is relatively constant and a load is changing. To meet these conditions the transmission is readily adaptable because the shifting carriage decreases the output speed and increases the torque.

Attached to the output shaft 15 the center portion of this shaft is of course discontinuous to provide for the constant movement of the arms to the spring clutches. Fixed upon end shaft 67 is an axial spring 41 secured within the shaft at 42 and to the casing side at 14. The spring mechanism is protected within an exterior housing 43 and mounted with screws 44 to the front side of the case 62. Attached within an opening of this offset portion is a handle 45 projecting through this exterior housing 43. On an arm of the handle is a plunger means 46 adapted to connect with a series of countersunk holes 47 in the face of the offset housing. By this means the transmission may be set at any particular speed that is desired by fastening the screw 46 into one of the holes 47. If, however, various limits are desired so that the transmission will go from minimum to half speed the plunger may be adjusted to drop into position when a certain hole is reached. By this same means, of course, a minimum speed may be set so that as the load increases only a certain minimum speed will be achieved under the varying load condition. This has the danger, of course, that the motor may stall, but it is useful for certain operations.

Figure 4:
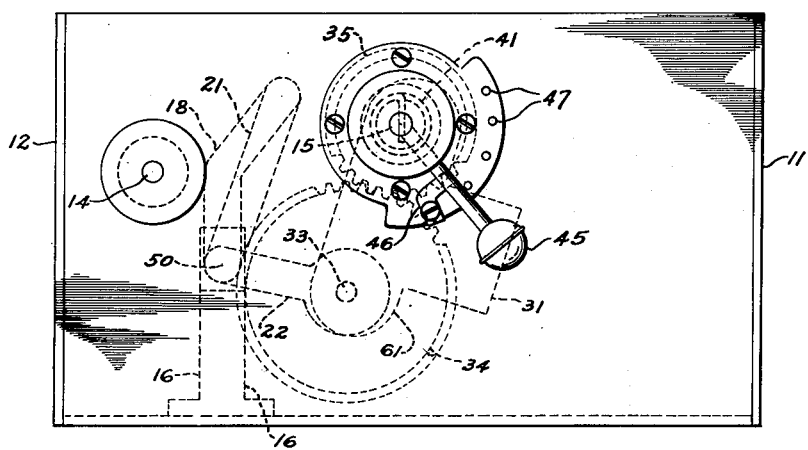
Fig. 4 is a front view of the transmission in maximum torque position.

A further study of the relations of the links as pictured in Fig. 4 will show that when link 21 has the same pivotal length center to center as the angular link 18 and is in minimum speed and maximum torque position, which is the position indicated in Fig. 4, the connecting pivot between link 21 and the spring clutch arm 66 will coincide with the pivotal center attached to the base member. When this position is reached any movement of the input shaft will move link 18, but because link 21 is pivoted about the same center it will reflect none of this movement and the speed will be zero. If link 21 is shorter than the center to center distance of link 18 it will continue to drive at a slow speed. If sufficient room is permitted for the link to pass in a clockwise direction about center 48 through the pivotal center mounted in rail 64, which center is indicated at 50, so that the link 21 is to the left of the position shown in Fig. 4, the rate will be less than zero and the output shaft will reverse in direction. It will be understood that the input shaft may rotate in either direction, though the explanation so far has been in one direction, and the output shaft will rotate in the same direction. This is so, of course, because the spring clutches operate in only one direction and there is a limited movement for the carriage. In spite of this, however, the transmission may be arranged so that the output shaft will reverse under certain conditions if sufficient space is provided. It will reverse at such a speed that link 21 is allowed to pivot through center 50. It may be advantageous in certain operations to clear the appliance or machine of whatever stoppage has caused the increased load.

Further, it should be made clear that the input shaft and the eccentric cams shown could take other forms, such as a crank shaft, but the applicant has chosen to use this form in his present models. The particular design of this oscillatory means is not meant to limit the application of the invention to this particular form since it is understood that others may be used.

Other modifications are meant to be included within scope of the invention and as such, the invention is not ment to be limited other than by the scope of the appended claims.

I claim:

1. A variable speed transmission having a frame, a drive and a driven shaft mounted in parallel relation in said frame, a gear on said driven shaft, a carriage comprising a U-shaped frame having a shaft therein in parallel relation to the drive and driven shafts, pivoted on the driven shaft to swing about the driven shaft, a gear on said carriage shaft meshing with the gear on the driven shaft, unidirectional clutch means on the carriage shaft having an operating arm therefor, pivoted link means carried by said frame and lying between the drive shaft and carriage shafts, one end of the link means being secured to the operating arm of the clutch means, eccentric means carried by the drive shaft and means connecting the other end of said link means to said eccentrics whereby operation of the drive shaft cause unidirectional rotation of the driven shaft and means permitting movement of the carriage shaft toward or away from the drive shaft in accordance with the load on the driven shaft.

2. A variable speed transmission as in claim 1 in which the carriage is spring biased to move away from the drive shaft as the load decreases.

References Cited in the file of this patent

UNITED STATES PATENTS

| | | |
|---|---|---|
| 599,545 | Altham | Feb. 22, 1898 |
| 914,108 | Bouchet | Mar. 2, 1909 |
| 1,263,546 | Frey | Apr. 23, 1918 |
| 1,557,432 | Defordt | Oct. 13, 1925 |
| 2,509,842 | Rossman | May 30, 1950 |

FOREIGN PATENTS

| | | |
|---|---|---|
| 19,963 | Germany | Nov. 17, 1882 |
| 607,499 | France | July 2, 1926 |
| 923,297 | France | July 2, 1947 |